(12) United States Patent
Hirata et al.

(10) Patent No.: US 12,469,603 B2
(45) Date of Patent: Nov. 11, 2025

(54) DIAGNOSIS SUPPORT APPARATUS, PROGRAM, AND DIAGNOSIS SUPPORT METHOD

(71) Applicant: Canon Medical Systems Corporation, Otawara (JP)

(72) Inventors: Koji Hirata, Kasukabe (JP); Kohei Watanabe, Utsunomiya (JP)

(73) Assignee: Canon Medical Systems Corporation, Otawara (JP)

( * ) Notice: Subject to any disclaimer, the term of this patent is extended or adjusted under 35 U.S.C. 154(b) by 394 days.

(21) Appl. No.: 18/055,980

(22) Filed: Nov. 16, 2022

(65) Prior Publication Data

US 2023/0154619 A1     May 18, 2023

(30) Foreign Application Priority Data

Nov. 16, 2021    (JP) ................................ 2021-186486

(51) Int. Cl.
     *G16H 50/20*       (2018.01)
     *A61B 6/03*        (2006.01)

(52) U.S. Cl.
     CPC ............. *G16H 50/20* (2018.01); *A61B 6/037* (2013.01)

(58) Field of Classification Search
     None
     See application file for complete search history.

(56) References Cited

U.S. PATENT DOCUMENTS

| 10,360,344 B2 | 7/2019 | Ribbing et al. |
|---|---|---|
| 2012/0290324 A1 | 11/2012 | Ribbing et al. |
| 2017/0369533 A1 * | 12/2017 | Bond .................... A61P 37/04 |
| 2019/0032146 A1 * | 1/2019 | Cornell ................ G16H 50/20 |
| 2022/0074929 A1 * | 3/2022 | Yao ................ G01N 33/54326 |

FOREIGN PATENT DOCUMENTS

| JP | WO 2006/043674 A1 | 5/2008 |
|---|---|---|
| JP | 2012-149994 A | 8/2012 |
| WO | WO 2019/068269 A1 | 4/2019 |

OTHER PUBLICATIONS

Extended European Search Report issued Apr. 17, 2023 in European Patent Application No. 22207880.0, 11 pages.
Seyed Hamed Jafari, et al., "Joint application of biochemical markers and imaging techniques in the accurate and early detection of glioblastoma," Pathology—Research and Practice, vol. 224, Jun. 18, 2021, 14 pages.
Office Action issued Aug. 5, 2025, in corresponding Japanese Patent Application No. 2021-186486 (with English translation), 9 pages.

* cited by examiner

*Primary Examiner* — Darryl V Dottin
(74) *Attorney, Agent, or Firm* — Oblon, McClelland, Maier & Neustadt, L.L.P.

(57) ABSTRACT

A diagnosis support apparatus according to the present embodiment includes at least a collation unit and an estimation unit. The collation unit collates information on an accumulation site of a diagnostic agent obtained from a captured nuclear medicine image of a subject with information on a site derived from an exosome containing the diagnostic agent collected from the subject. As a result of the collation, the estimation unit estimates that a tumor is present at a site of the first site information which is matched with the second site information.

15 Claims, 10 Drawing Sheets

(a) Simple CT  (b) PET/CT (c)

DIAGNOSIS SUPPORT APPARATUS, PROGRAM, AND DIAGNOSIS SUPPORT METHOD

CROSS-REFERENCE TO RELATED APPLICATIONS

This application is based upon and claims the benefit of priority from Japanese Patent Application No. 2021-186486, filed Nov. 16, 2021, the entire contents of which are incorporated herein by reference.

FIELD

Embodiments described herein relate generally to a diagnosis support apparatus, a program, and a diagnosis support method.

BACKGROUND

In nuclear medicine imaging diagnosis, the position of a tumor is estimated by an accumulated diagnostic agent location, but it is known that determination largely varies depending on the level of proficiency of a radiologist, and false negatives and false positives can occur. For example, it is reported that, in the case of suspected lung malignancy, 18.4 percent are false negative and 4.35 percent are false positive. In addition, it is reported that, in the case of residual or recurrent oropharyngeal squamous cell carcinoma after chemoradiotherapy, 59.2 percent are false positive.

One problem to be solved by the embodiments disclosed in the present specification and drawings is to reduce false negatives and false positives in nuclear medicine imaging diagnosis. However, the problem to be solved by the embodiments disclosed in the present specification and the drawings is not limited to the above problem. The problem corresponding to each effect of each configuration shown in the embodiments described later can be considered as another problem.

BRIEF DESCRIPTION OF THE DRAWINGS

FIG. 10(A) is a simple CT image of the chest, FIG. 10(B) is a PET/CT image of the chest, and FIG. 10(C) is a simple CT image of the abdomen.

DETAILED DESCRIPTION

Hereinafter, embodiments of a diagnosis support apparatus, a program, and a diagnosis support method will be described in detail with reference to the drawings.

First Embodiment

An example of a diagnosis support apparatus according to a first embodiment is an apparatus used in a diagnosis support method including: combining information on an accumulation site (region) of a diagnostic agent obtained from a captured nuclear medicine image of a subject with information on a site derived from an exosome obtained from exosome analysis of the identical subject; and estimating a site where a tumor is present in the subject.

Figure 1:
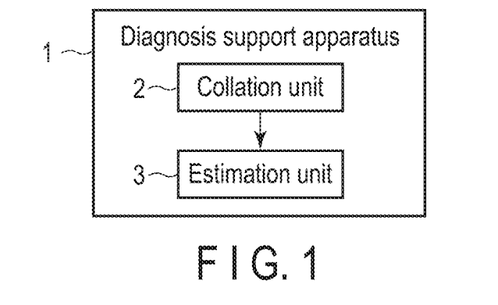
FIG. 1 is a block diagram illustrating an example of a diagnosis support apparatus according to a first embodiment.

FIG. 1 is a block diagram illustrating a configuration example of a diagnosis support apparatus according to a first embodiment. For example, as illustrated in FIG. 1, a diagnosis support apparatus 1 according to the present embodiment includes at least a collation unit 2 and an estimation unit 3. The collation unit 2 collates information on an accumulation site of a diagnostic agent obtained from a captured nuclear medicine image of a subject (hereinafter, also referred to as "first site information") with information on a site derived from an exosome containing the diagnostic agent collected from the subject (hereinafter, also referred to as "second site information"). As a result of the collation, the estimation unit 3 estimates that a tumor is present at a site of the first site information which is matched with the second site information.

For example, the estimation unit may determine, a result of the collation, that a tumor is present at a site included in the first site information and the second site information (positive), may determine that a disease other than a tumor is present at a site included in the first site information but not included in the second site information (false positive), and may determine that a tumor is present at a site not included in the first site information but included in the second site information (false negative).

Second Embodiment

Figure 2:
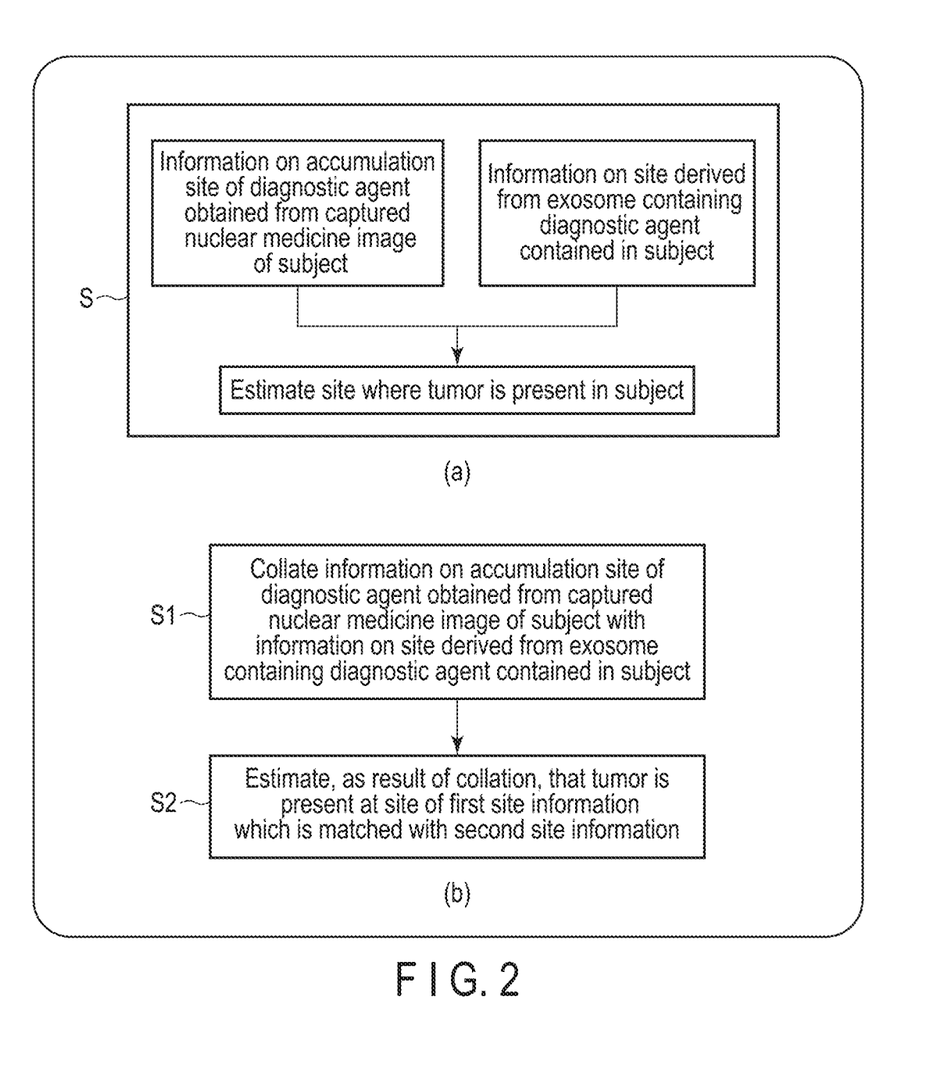
FIG. 2 is a chart illustrating an example of a diagnosis support method according to a second embodiment and a method executed by a diagnosis support program according to a third embodiment.

As illustrated in FIG. 2(A), a diagnosis support method according to a second embodiment can be a diagnosis support method of estimating a site where a tumor is present in a subject by using information on an accumulation site of a diagnostic agent obtained from a captured nuclear medicine image of the subject and information on a site derived from an exosome containing the diagnostic agent contained in the subject (step S).

FIG. 2(B) is a flow chart illustrating a configuration example of the diagnosis support method according to the second embodiment. For example, as illustrated in FIG. 2(B), the diagnosis support method according to the present embodiment may include:

collating first site information as information on an accumulation site of a diagnostic agent obtained from a captured nuclear medicine image of a subject with second site information as information on a site derived from an exosome containing the diagnostic agent collected from the subject (step S1); and estimating, as a result of the collation, that a tumor is present at a site of the first site information which is matched with the second site information (step S2).

For example, step S1 can be executed by the collation unit 2 of the diagnosis support apparatus 1 according to the first embodiment, and step S2 can be executed by the estimation unit 3.

Third Embodiment

For example, there may be provided a program for causing the diagnosis support apparatus illustrated in FIG. 1 to execute the diagnosis support method illustrated in FIGS. 2(A) and (B). An example of the diagnosis support program includes:

collating first site information as information on an accumulation site of a diagnostic agent obtained from a captured nuclear medicine image of a subject with second site information as information on a site derived from an exosome containing the diagnostic agent collected from the subject (S1); and estimating, as a result of the collation, that a tumor is present at a site of the first site information which is matched with the second site information (S2). For example, such a program is a program that can implement the diagnosis support method of the embodiment by a processing system such as a computer, and can be a diagnosis support program that executes step S1 and step S2.

For example, step S1 may include:
obtaining a captured nuclear medicine image from a subject to whom a diagnostic agent has been administered;
acquiring first site information as information on an accumulation site of the diagnostic agent from the obtained captured image;
acquiring molecular information on an exosome which is collected from the subject and contains the diagnostic agent;
acquiring second site information as information on a site derived from the exosome, from the molecular information of the exosome; and
collating the first site information with the second site information.

In other words, a further configuration example of the diagnosis support method according to the second embodiment includes:
obtaining a captured nuclear medicine image from a subject to whom a diagnostic agent has been administered;
acquiring first site information as information on an accumulation site of the diagnostic agent from the obtained captured image;
acquiring molecular information on an exosome which is collected from the subject and contains the diagnostic agent;
acquiring second site information as information on a site derived from the exosome, from the molecular information of the exosome;
collating the first site information with the second site information; and
estimating, as a result of the collation, that a tumor is present at a site of the first site information which is matched with the second site information.

Fourth Embodiment

A diagnosis support method according to a fourth embodiment may be performed using a diagnosis support apparatus 1. The diagnosis support method according to the fourth embodiment, as illustrated in FIG. 4, may include:
administering a diagnostic agent to a subject (step S1);
capturing a nuclear medicine image of the subject (step S2);
acquiring first site information as information on an accumulation site of the diagnostic agent, from the captured image (step S3);
collecting an exosome containing the diagnostic agent from the subject (step S4);
acquiring molecular information on the exosome (step S5);
acquiring second site information as information on a site derived from the exosome, from the molecular information on the exosome (step S6);
collating the first site information with the second site information (step S7); and
estimating that, as a result of the collation, a tumor is present at a site of the first site information which is matched with the second site information (step S8).

Hereinafter, an example of a detailed procedure of the diagnosis support method according to the fourth embodiment will be described with reference to FIGS. 3 and 4.

Figure 3:
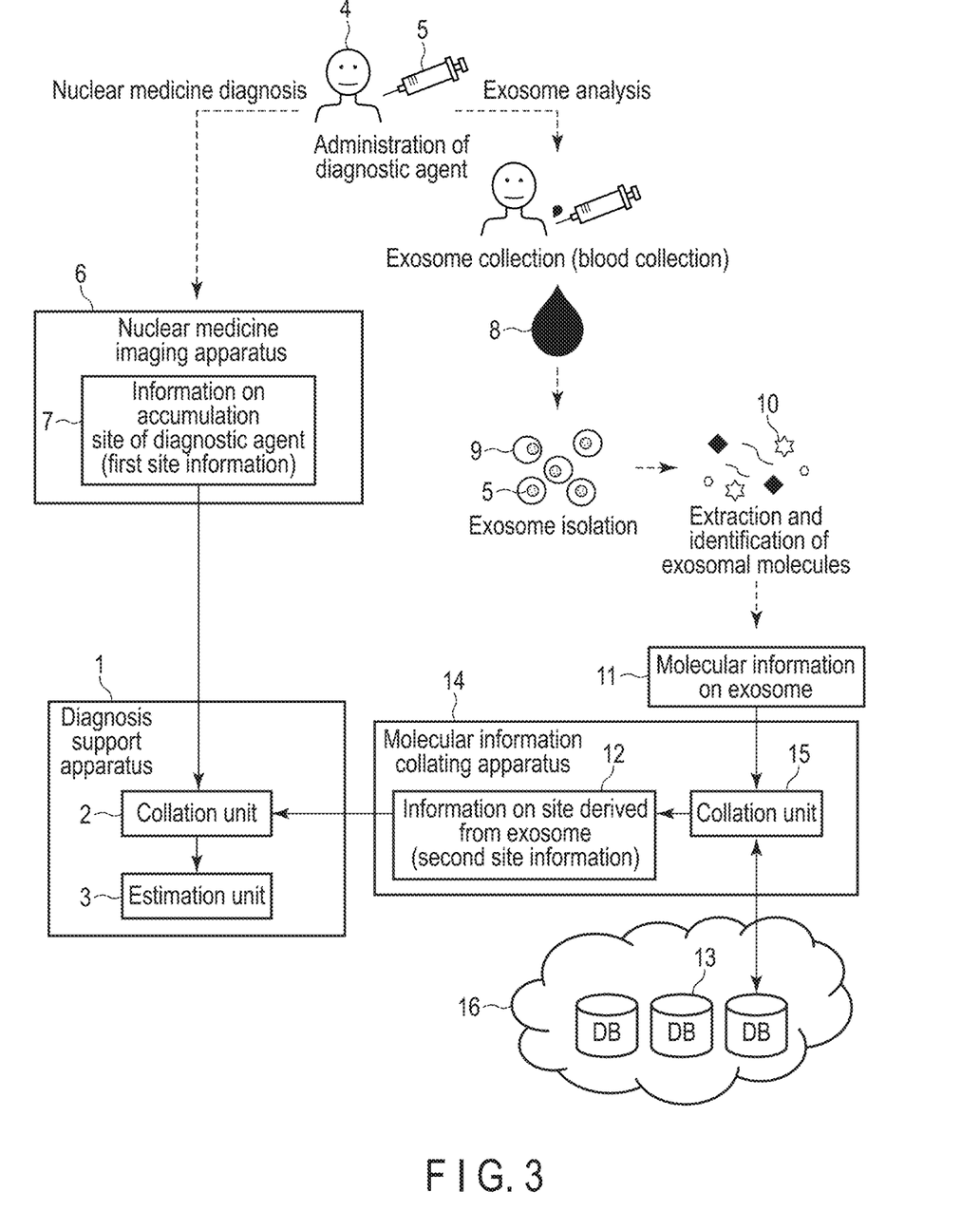
FIG. 3 is a flow chart illustrating an example of a diagnosis support method according to a fourth embodiment.
Figure 4:
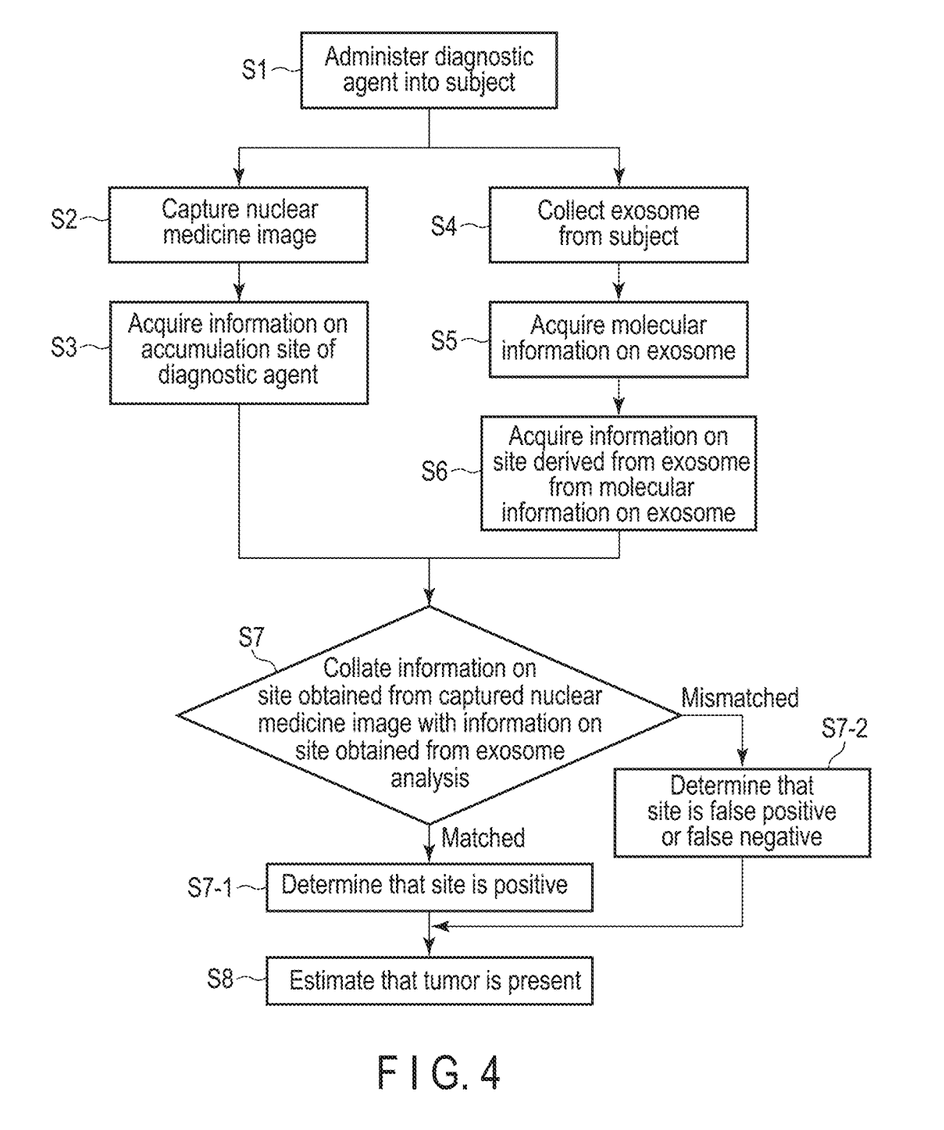
FIG. 4 is a flow chart illustrating an example of the diagnosis support method according to the fourth embodiment.

As illustrated in FIGS. 3 and 4, a diagnostic agent 5 is first administered to a subject 4 (step S1).

The subject 4 is preferably a human. However, the subject may be an animal other than the human. The animal other than the human is, for example, an organism belonging to mammals, birds, amphibians, reptiles, or fish. The mammals may be any of mammals, for example, primates such as monkeys; rodents such as mice, rats, and guinea pigs; companion animals such as dogs, cats, and rabbits, livestock such as horses, cows, and pigs; or mammals belonging to exhibition animals or the like.

The diagnostic agent 5 is, for example, a substance that is accumulated in tumor cells and is detectable by a nuclear medicine imaging apparatus. For example, the diagnostic agent 5 is a compound containing a radioactive isotope. Examples of the compound include $[^{18}F]$2-Fluorodeoxy-D-glucose($[^{18}F]$FDG), $[^{18}F]$6-Fluoro-m-tyrosine, L-[3-$^{18}F$]-a-Methyltyrosine, S-[Methyl-$^{11}C$]-methionine, trans-1-Amino-3-$[^{18}F]$fluorocyclobutanecarboxylic acid, 3'-Deoxy-[3'-$^{18}F$]thymidine, [$^{11}$C-Methyl]thymidine, 2-[$^{11}$C]Tymidine, [$^{11}$C]Methionine, [$^{18}F$]Fluorothymidine, 4'-[Methyl-$^{11}C$]-thiotymidine, [$^{11}$C]Acetate, [$^{11}$C]Choline, [$^{18}F$]Fluorocholine, [$^{18}F$]Fluoromisonidazole, [$^{18}F$]Fluoroazomycin arabinofuranoside, and/or [$^{62}$Cu]Diacetyl-bis(N4-methylthiosemicarbazone).

The method of administering the diagnostic agent 5 to the subject 4 is not particularly limited, but may be any method known in itself which can introduce the diagnostic agent into a site targeted by the diagnosis support method according to the embodiment. For example, the administration may be intravenous administration, intraarterial administration, intradermal administration, subcutaneous administration, intramuscular administration, oral administration, or the like. For example, for whole body imaging, the administration may be intravenous injection or the like.

Figure 5:
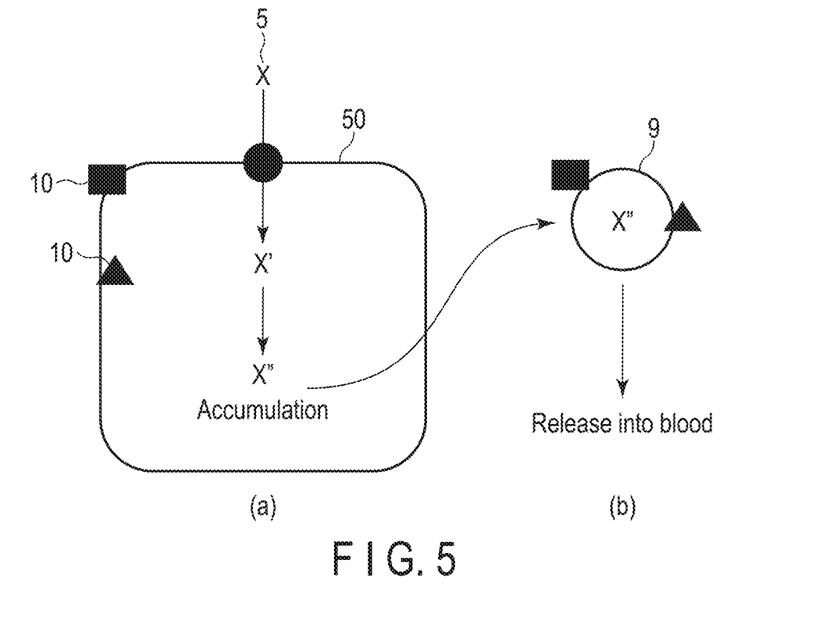
FIG. 5 is a schematic view illustrating an example of metabolism of a diagnostic agent of the diagnosis support method according to the fourth embodiment.

The diagnostic agent 5 administered in step S1 can be diffused into the subject 4 and taken up by various cells. For example, as shown in FIG. 5(A), the diagnostic agent 5 accumulates in a cell 50 (tumor cell) in which the metabolism of the diagnostic agent 5 ("X" in FIG. 5) is not progressed. The diagnostic agent 5 may accumulate through several stages of metabolism ("X'" or "X''" in the figure).

Next, a nuclear medicine image of the subject 4 is captured (FIG. 4, step S2).

As illustrated in FIG. 3, the nuclear medicine image is captured using, for example, a nuclear medicine imaging apparatus 6. When the radioactive isotopes contained in the diagnostic agent 5 described above emit positrons, the positrons emitted from the radioactive isotopes annihilate with neighboring electrons, and as a result, two annihilation radiations (gamma rays) are emitted in directions opposite to each other by 180 degrees. For example, it is possible to use the nuclear medicine imaging apparatus 6 which simultaneously counts gamma rays emitted in the two directions, and thus detects signals and images the signals. Specifically, in the apparatus, two gamma rays are simultaneously detected by a plurality of gamma-ray detectors arranged in a ring shape around a sample, thereby obtaining data (e.g., a sinogram) indicating that radioactive isotopes are present on a line connecting the gamma-ray detectors by which the gamma rays are detected. Then, the data is image-reconstructed to obtain a tomogram representing the distribution of the radioactive isotopes. For example, a positron emission tomography (PET) scanner, a PET-CT scanner in which a PET scanner and an X-ray computed tomography (CT) scanner are combined, a time-of-flight PET (TOF-PET) scanner, or the like can be used as the apparatus.

When radioactive isotopes emit gamma rays, it is possible to use, for example, the nuclear medicine imaging apparatus 6 which detects such gamma rays by a gamma-ray detector including a collimator (e.g., a parallel collimator) on the sample side. The detection results in obtaining data such as the position of the gamma-ray detector at which the gamma rays have reached and power pulses have been output and the number of the detected power pulses, and a planar image can be created from the data. The gamma-ray detector detects gamma rays from various directions of the sample and collects planar images, a computer reconstructs the images, as a result of which a tomogram representing the distribution of radioactive isotopes can be obtained. For example, a single photon emission computed tomography (SPECT) scanner, a SPECTCT scanner in which a SPECT scanner and a CT scanner are combined, or the like can be used as the device.

The image capturing process described above makes it possible to obtain information (first site information) 7 on the accumulation site of the diagnostic agent 5 in the subject 4. Since the diagnostic agent 5 is accumulated in tumor cells, the first site information 7 is information on a site where a tumor is determined to be present in the captured nuclear medicine image.

The term "site" used herein refers to an organ or tissue of the subject 4. The organ is not limited, and examples thereof include brain, lung, breast, esophagus, stomach, large intestine, colon, rectum, liver, pancreas, bladder, prostate, cervix, and ovary. The tissue refers to subclassification of the above organs. In the case of lung, the subclassified organ may be a non-small cell, a small cell, a gland, a squamous epithelium, a large cell, or the like.

The first site information 7 may be acquired by a technician or a radiologist viewing captured image data, or may be automatically acquired by image analysis software or the like. Alternatively, the acquisition may be performed by accessing a database present inside or outside the nuclear medicine imaging apparatus 6 and collating the captured image data with information accumulated in the database.

Meanwhile, after step S1, the exosome containing the diagnostic agent 5 is collected from the subject 4 (FIG. 4, step S4).

As described above for FIG. 5(A), the diagnostic agent 5 accumulates in the cell 50 in which the metabolism of the diagnostic agent 5 is not progressed by the administration of the diagnostic agent 5. However, as shown in FIG. 5(B), when the exosome 9 is produced from the cell 50, the accumulated diagnostic agent 5 can be incorporated into the exosome 9. As a result, the exosome 9 containing the diagnostic agent 5 is released into the blood.

Figure 6:
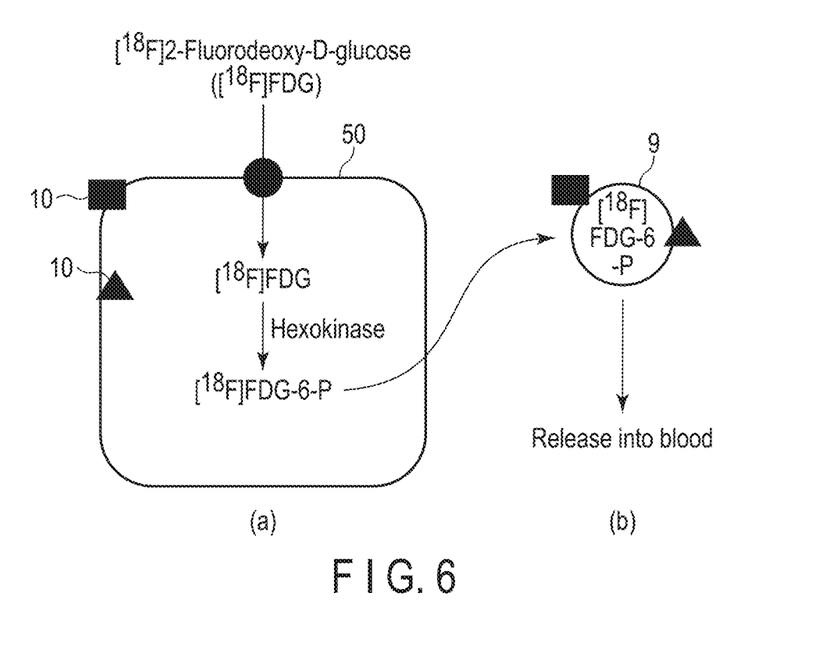
FIG. 6 is a schematic view illustrating an example of metabolism of a diagnostic agent of the diagnosis support method according to the fourth embodiment.

An example in which the diagnostic agent 5 is [$^{18}$F]2-Fluorodeoxy-D-glucose([$^{18}$F]FDG) will be described with reference to FIG. 6. The [$^{18}$F]FDG administered to the subject 4 is taken up by the cell 50 in the subject 4. The [$^{18}$F]FDG thus taken up is metabolized by hexokinase to form [$^{18}$F]FDG-6-P. The [$^{18}$F]FDG-6-P accumulated in the cell 50 is taken up by the exosome 9 and released into the blood.

The exosome 9 is a minute vesicle (particle size: about 100 nm) contained in a living body. The exosome 9 is secreted from a cell, has a lipid bilayer membrane structure containing nucleic acids, proteins, and the like therein, moves between distant organs, and has a function of transporting substances and transmitting information. It has also been reported that the lipid bilayer membrane contains proteins, glycoproteins, and the like, and a nucleic acid such as DNA is attached around the lipid bilayer membrane. The type or combination of molecules thereof is specific depending on the type of cell produced, and the analysis of them allows for acquisition of information on the cell 50 from which the exosome 9 is derived. Hereinafter, such a molecule specific to the type of exosome is also referred to as an "exosomal molecule 10".

The collection of the exosome can be performed, for example, as illustrated in FIG. 3, by collecting blood from the subject 4 and isolating the exosome 9 containing the diagnostic agent 5 from blood 8 thus obtained.

In order to isolate the exosome 9 containing the diagnostic agent 5, the blood is preferably collected before the half-life of the radioactive isotope contained in the diagnostic agent 5 passes. For example, since the half-life of [$^{18}$F] in [$^{18}$F]FDG is about 2 hours, when [$^{18}$F]FDG is used as the diagnostic agent 5, the blood is preferably collected within 2 hours after administration.

The diagnosis support apparatus 1 may display the time of blood collection, the time until blood collection, or the like. When the blood 8 is collected from a plurality of subjects 4, the diagnosis support apparatus 1 may display the time of blood collection, the time until blood collection, or the like from each of the subjects 4. This display may be on a display unit which can be further included in the diagnosis support apparatus 1, or may be on a display unit which can be included in the nuclear medicine imaging apparatus 6 or a molecular information collating apparatus 14 in communication with the diagnosis support apparatus 1. In addition to the display, the time or the like may be indicated by a signal such as sound or light.

The isolation of the exosome 9 can be performed by a known method. For example, a commercially available exosome isolation kit may be used. At this time, an operation of separating the exosome 9 containing the diagnostic agent 5 and the exosome 9 not containing the diagnostic agent 5 may be performed.

Subsequently, molecular information 11 on the exosome 9 is obtained (FIG. 4, step S5).

The molecular information 11 includes information such as the type and/or amount of the exosomal molecule 10 contained in the collected exosome 9. As illustrated in FIG. 3, the molecular information 11 can be acquired, for example, by extracting the exosomal molecule 10 from the isolated exosome 9 and identifying and/or quantifying the extracted exosomal molecule.

The exosomal molecule 10 includes, for example, a nucleic acid, an enzyme, a membrane protein, a skeletal protein, a single molecule, and/or a chaperone protein. The exosomal molecule 10 may include, for example, an exosomal molecule 10 which can be associated with information on (derived from) the produced cell 50 and an exosomal molecule 10 which can be associated with the fact that the molecule itself is an exosome.

For example, the exosomal molecule 10 that can be associated with information on (derived from) the produced cell 50 is not limited, and examples thereof include exosomal microRNA (miRNA), messenger RNA (mRNA), and/or DNA.

There is no limitation on the exosomal molecule 10 which can be associated with the fact that the molecule itself is an exosome, and examples of the exosomal molecule include enzymes such as GAPDH, PK, ATPase, PGK, and enolase; cytoskeletal proteins such as Actin, Myosin, Vimentin, Tubulin, Cofilin, Profilin, and Fibronectin; signal molecules such as EGF-R, HIF-1a, CDC42, PI-3K, ARF1, and Rab5b; chaperone proteins such as HSP70, HSP90, HSP60, and HSC70; tetraspanins such as CD9, CD63, and CD81, integrins such as α6β4, α6β1, and αvβ5; multiple vesicle-forming molecules such as MHC class I molecule, MHC class II molecule, TSG101, Clathrin, Ubiquitin, and Alix; and lipid rafts such as Flotillin-1.

After dissolving the exosome in a water-like buffer or the like, the exosomal molecule 10 can be extracted by a known method according to the type of exosome. For example, a commercially available nucleic acid or protein extraction kit may be used.

Next, the extracted exosomal molecule 10 is identified and/or quantified. Identification and quantification of proteins can be performed by, for example, a protein sequencer method, a sequence tag method, or a peptide mass fingerprinting method. The nucleic acid can be identified and quantified using, for example, a nucleic acid amplification method such as a PCR method, a LAMP method or a TRC method, or a sequencer method.

Next, information on a site derived from an exosome (second site information) 12 is acquired from the obtained molecular information 11 on the exosome (step S6). The second site information 12 is obtained, for example, by collating the molecular information 11 on the exosome with an information group associating a large number of exosomal molecules 10 obtained from past knowledge with sites derived from the exosomal molecules.

For example, when the information included in the molecular information 11 on the exosome includes exosomal molecules a, b, c, and d, the collation is performed on each of the exosomal molecules a, b, c, and d, thereby acquiring information on a site derived from the exosomal molecule 10 which is matched with each of the collated exosomal molecules. The derived site information to be acquired may be plural for one type of exosomal molecule 10. Examples of the association of the exosomal molecule 10 with the site derived therefrom include, but are not limited to, miR-30 c and lung cancer, miR-181 c and breast cancer or brain tumor, miR-34 a and ovarian cancer, and MMP-1 mRNA and ovarian cancer.

Alternatively, there is a case where a combination of a plurality of exosomal molecules 10 is associated with information on certain sites derived from the exosomal molecules. When the combination is included in the molecular information 11 on the exosome (e.g., exosomal molecules a and b), the information on certain sites derived from the exosomal molecules may be acquired. In addition, there is a case where the amounts of the exosomal molecules 10 are associated with the information on certain sites derived from the exosomal molecules, and derived sites matched with the amounts of the exosomal molecules (e.g., the amount of the exosomal molecule a, the amount of the exosomal molecule b) may be acquired.

Such collation and acquisition of the second site information 12 may be performed using the molecular information collating apparatus 14 as illustrated in FIG. 3. The molecular information collating apparatus 14 is, for example, a computer, and includes a collation unit 15 which collates an information group stored in a database (DB) 13 with the molecular information 11 on the exosome, the information group associating information on a large number of exosomal molecules 10 with sites derived from the exosomal molecules.

The database 13 may be disposed in the molecular information collating apparatus 14 or may be disposed outside the apparatus. The database 13 outside the apparatus may be stored in, for example, a web service (e.g., a cloud 16 or the like), and the molecular information collating apparatus 14 may be connected to the cloud 16 in order to access the information group. The database 13 may be, for example, a medical database, a chemical database, a review, a comment, a textbook, or the like, in Japan and overseas. Note that the various types of data used herein are typically digital data.

For example, when the molecular information 11 on an exosome of a certain subject 4 is input to the molecular information collating apparatus 14, the collation unit 15 accesses the database 13 to read an information group included therein, and collates the molecular information 11 on the exosome of the subject 4 with the information group. As a result of the collation, the site derived information matched with the molecular information 11 on the exosome of the subject 4 is output as the second site information 12. Alternatively, the function of the collation unit 15 may be included in the database 13. In this case, the molecular information 11 on the exosome is sent to the database 13, collation is performed at the database, and the second site information 12 is sent to the molecular information collating apparatus 14.

When there is a plurality of subjects 4, for example, collation may be performed for each of the subjects 4 and the collation results may be returned.

In addition, whether or not the collected sample contains an exosome may be simultaneously determined from the molecular information 11 on the exosome. For example, the molecular information 11 on the exosome is collated with the information group using the database 13 storing the information group of the exosome molecule 10 which can be associated with the fact that the molecule itself is an exosome as described above. When a mismatched collation result is obtained, it is preferable to stop the collation without proceeding to the next step and collect the exosome again. This collation is performed, and thus a more accurate result can be obtained.

As described above, the information on an accumulation site of the diagnostic agent (first site information) 7 is obtained by steps S2 to S3 of capturing a nuclear medicine image, and the information on a site derived from an exosome (second site information) 12 is obtained by steps S4 to S6 of performing exosome analysis. It does not matter which of steps S2 to S3 and steps S4 to S6 are performed first, or steps S2 to S3 may proceed simultaneously with steps S4 to S6. Up to this point, the procedure can be determined so as to obtain accurate information in consideration of, for example, the half-life of radioisotopes in the diagnostic agent 5.

Next, the first site information 7 is collated with the second site information 12 (step S7). The collation is performed by, for example, the collation unit 2 of the diagnosis support apparatus 1. The diagnosis support apparatus 1 receives the first site information 7 from the nuclear medicine imaging apparatus 6, receives the second site information 12 from the molecular information collating apparatus 14, and sends the first site information 7 and the second site information 12 to the collation unit 2. Then, the collation unit 2 collates the first site information 7 with the second site information 12. The collation may be performed, for example, by investigating whether each site included in the first site information 7 is included in the second site information 12.

Among the sites included in the first site information 7, a site matched with the collation result is determined to have a tumor (positive) (step S7-1). In the mismatched case, it is determined that there is a site having no tumor (possibility of having a disease other than a tumor) in the first site information 7 (false positive), or there is a site that has a tumor, but is not included in the first site information 7 (false negative) (FIG. 4, step S7-2).

Here, "positive", "false positive", and "false negative" are determinations based on the first site information 7 obtained by capturing nuclear medicine images.

It is considered that the false positive occurs in the case of active inflammation such as acute inflammation, chronic inflammation, abscess, tuberculosis, sarcoidosis or chronic thyroiditis, or in the case of salivary gland tumor, benign bone tumor, intestinal hyperperistalsis, enteritis, artificial anus site, colon polyp, menstrual endometrium, ovulatory ovary, lactating mammary gland, uterine fibroid, endometriosis, benign ovarian tumor (chocolate cystoma/teratoma) or brown fat (cold period) in which the physiological accumulation of the diagnostic agent 5 is high regardless of the normal state or the disease state.

The false negative is considered to occur, for example, when the tumor diameter is 9 mm or less, when the G-6-P phosphatase activity is high as in primary liver cancer, when the tumor has a low cell density as in gastric signet ring cell cancer, ovarian mucinous adenocarcinoma, or the like, when the tumor is in contact with the urinary tract as in renal cancer, bladder cancer, prostate cancer, or the like, or when the tumor is a highly differentiated tumor such as highly differentiated lung adenocarcinoma or ovarian borderline malignancy.

The presence of a tumor in the subject 4 can be estimated by the flow of step S7. An operation of estimating the presence of a tumor can be to estimate a site where the tumor is present in the subject 4 by integrating the determinations for each site. For example, it is estimated that a tumor is present at a site that is positive in the above determination.

The determination and estimation can be performed by, for example, the estimation unit 3 of the diagnosis support apparatus 1. The estimation unit 3 performs the determination and estimation based on the collation result sent from the collation unit 2, and outputs an estimation result.

Figure 7:
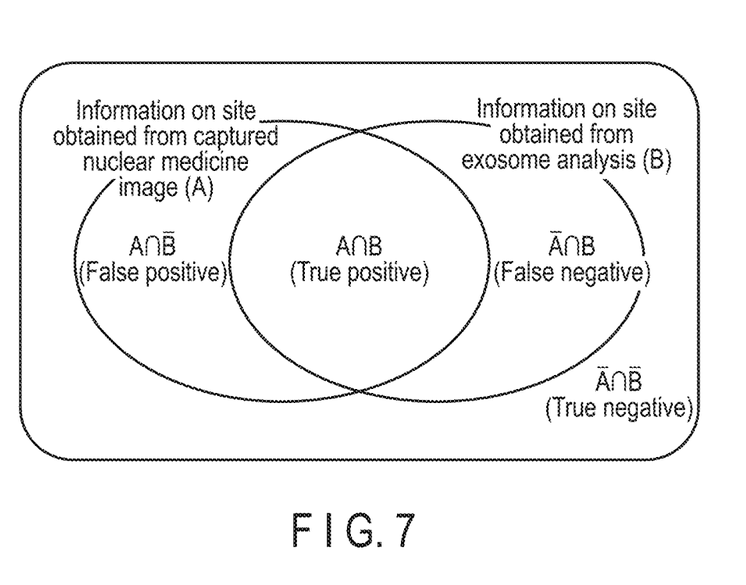
FIG. 7 is a Venn diagram illustrating an example of estimation conditions in the diagnosis support method according to the fourth embodiment.

In a further embodiment, the estimation unit 3 may perform determination according to the Venn diagram illustrated in FIG. 7. For example, when information on an accumulation site of a diagnostic agent obtained from a captured nuclear medicine image (first site information) 7 is "A", and information on a site derived from an exosome obtained from exosome analysis (second site information) 12 is "B", the determination can be made according to conditions of Table 1 below.

TABLE 1

| | Conditions | Expression | Determination |
|---|---|---|---|
| 1 | Site included in A and B | $A \cap B$ | True positive |
| 2 | Site included in A but not included in B | $A \cap \overline{B}$ | False positive |
| 3 | Site not included in A but included in B | $\overline{A} \cap B$ | False negative |
| 4 | Site included neither in A nor in B | $\overline{A} \cap \overline{B}$ | True negative |

In the determination according to the conditions of Table 1, all the site information included in both the first site information 7 and the second site information 12 ($A \cup B$) is first acquired, the sites included in the acquired site information are applied to the four conditions one by one, and the following determinations are performed:
  the site included in A and B (condition 1) is determined to have a tumor (true positive);
  the site included in A but not included in B (condition 2) is determined to have no tumor or have a possibility of having a disease other than a tumor (false positive); and
  the site not included in A but included in B (condition 3) is determined to have a tumor (false negative), although the tumor has not been able to be detected by capturing a nuclear medicine image.

The site included neither in A nor in B (condition 4) can be determined to have no tumor (true negative).

From the above determination result, the presence of a tumor in the subject 4 can be estimated (step S8).

Figure 8:
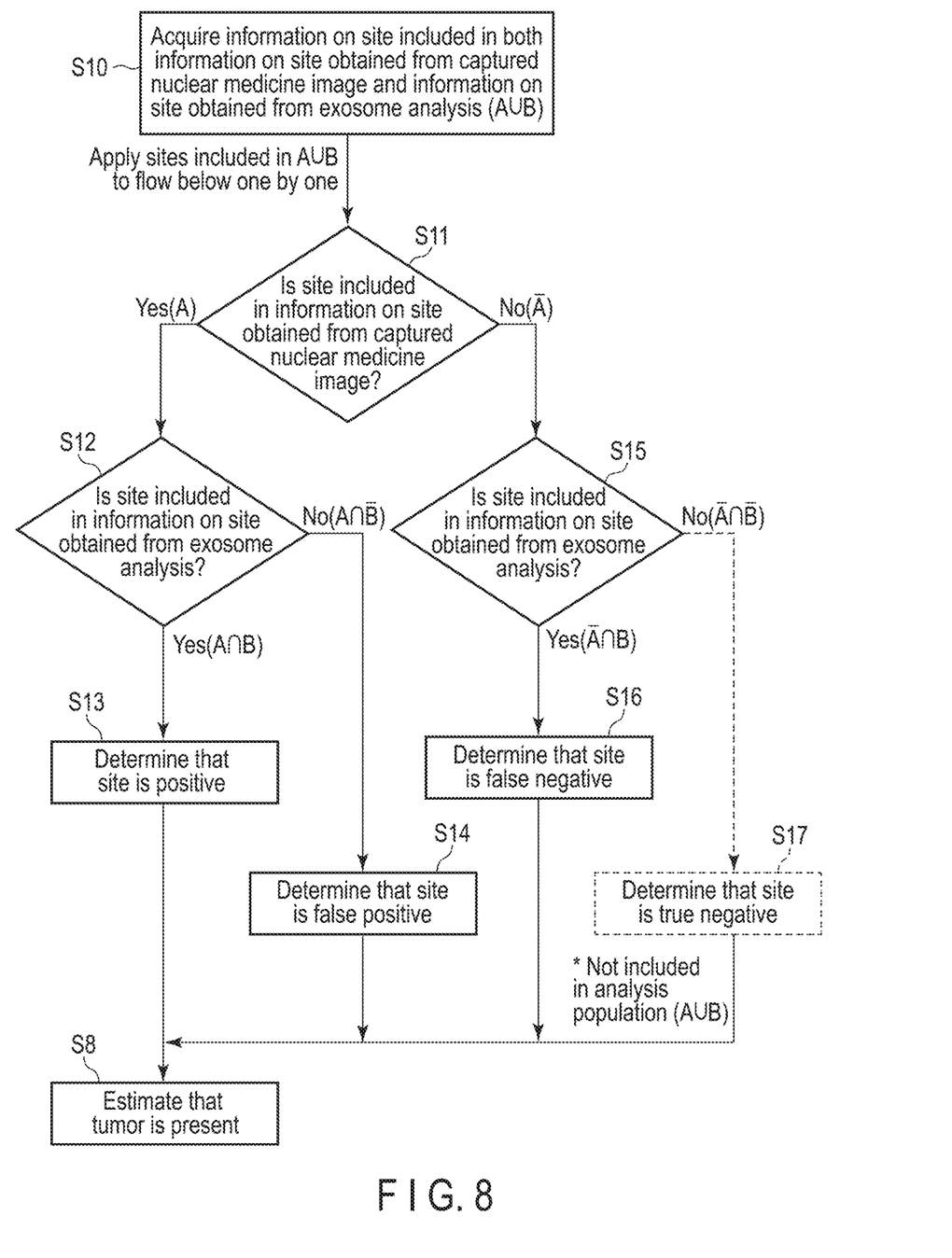
FIG. 8 is a flow chart illustrating an example of an estimation procedure in the diagnosis support method according to the second embodiment and the method executed by the diagnosis support program according to the third embodiment.

Such determination and estimation can be performed by the estimation unit 3 in a flow as illustrated in FIG. 8, for example. First, all the site information (analysis population) included in both the first site information 7 and the second site information 12 ($A \cup B$) is acquired (step S10). Thereafter, the sites included in the analysis population are applied to the next flow one by one.

First, it is determined whether the site is included in the first site information 7 (step S11). When the site is included (Yes), it is then determined whether the site is included in the second site information 12 (step S12). When the site is included (Yes), the site is determined as true positive (step S13). When the site is not included (No), the site is determined as false positive (step S14).

As a result of step S11, when the site is not included (No), it is then determined whether the site is included in the second site information 12 (step S15). When the site is included (Yes), the site is determined as false negative (step S16). Here, when there is a site that is determined not to be included in the analysis population acquired in S10 and not to be included (No) in step S15, the site is determined as true negative (step S17).

This process is repeated for all sites included in the analysis population. As a result, for each site, any one of three determinations of steps S13, S14, and S16 is made, and any one of four determinations including S17 is made as necessary. A site where a tumor is present in the subject 4 is estimated based on the information on the determinations of each site (step S8). According to such an estimation method, the first site information 7 can be classified into four types of determination results based on four conditions.

Figure 9:
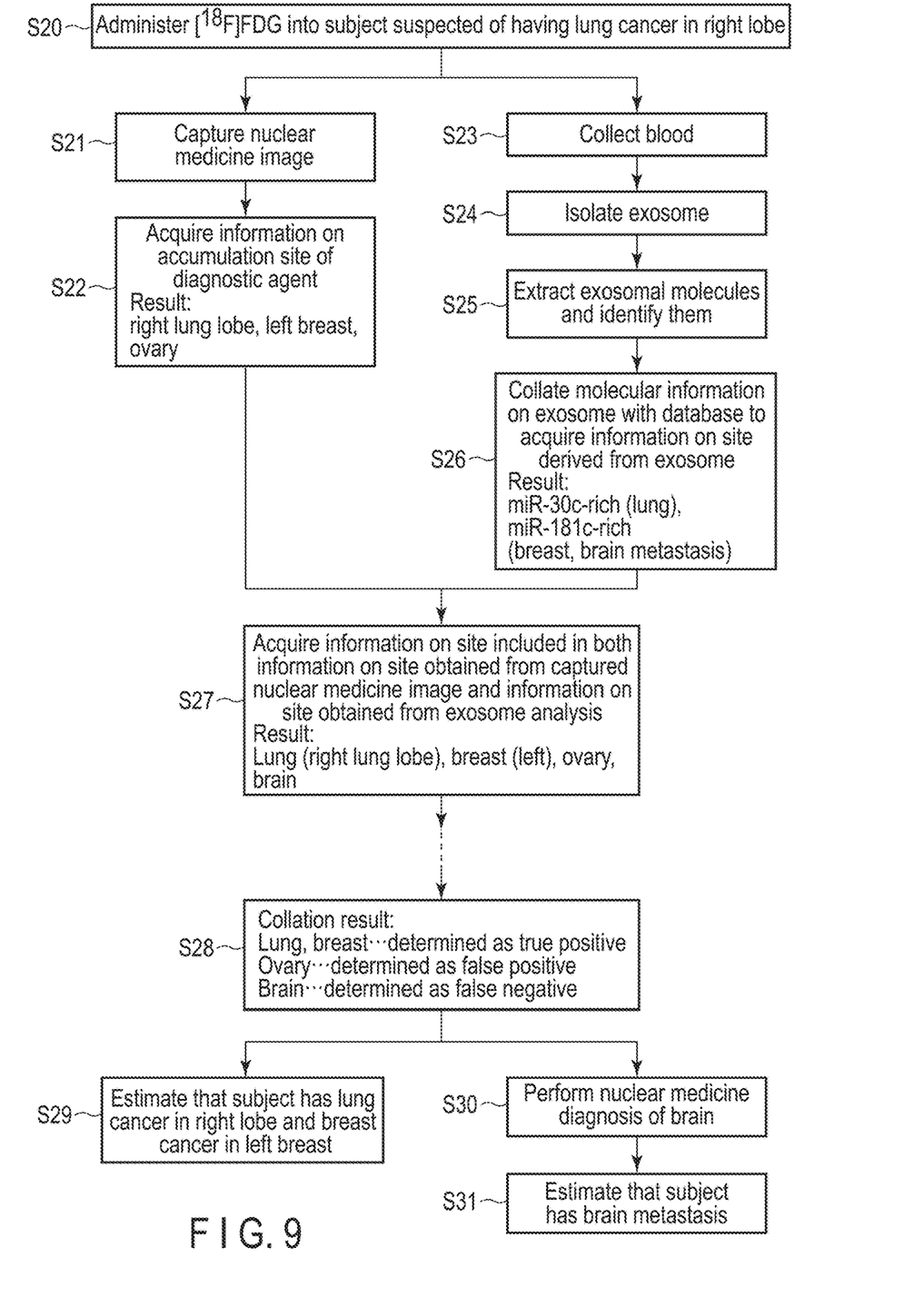
FIG. 9 is a flow chart illustrating an example of the diagnosis support method according to each of the embodiments.

Hereinafter, an example in which [$^{18}$F]FDG is administered as the diagnostic agent 5 to the subject 4 (female) suspected of having lung cancer in the right lobe will be described with reference to FIG. 9.

First, [$^{18}$F]FDG was administered to the subject 4 (step S20). Then, 60 minutes later, a whole body FDG-PET/CT image was captured (S21) and the blood was collected (S23).

Figure 10:
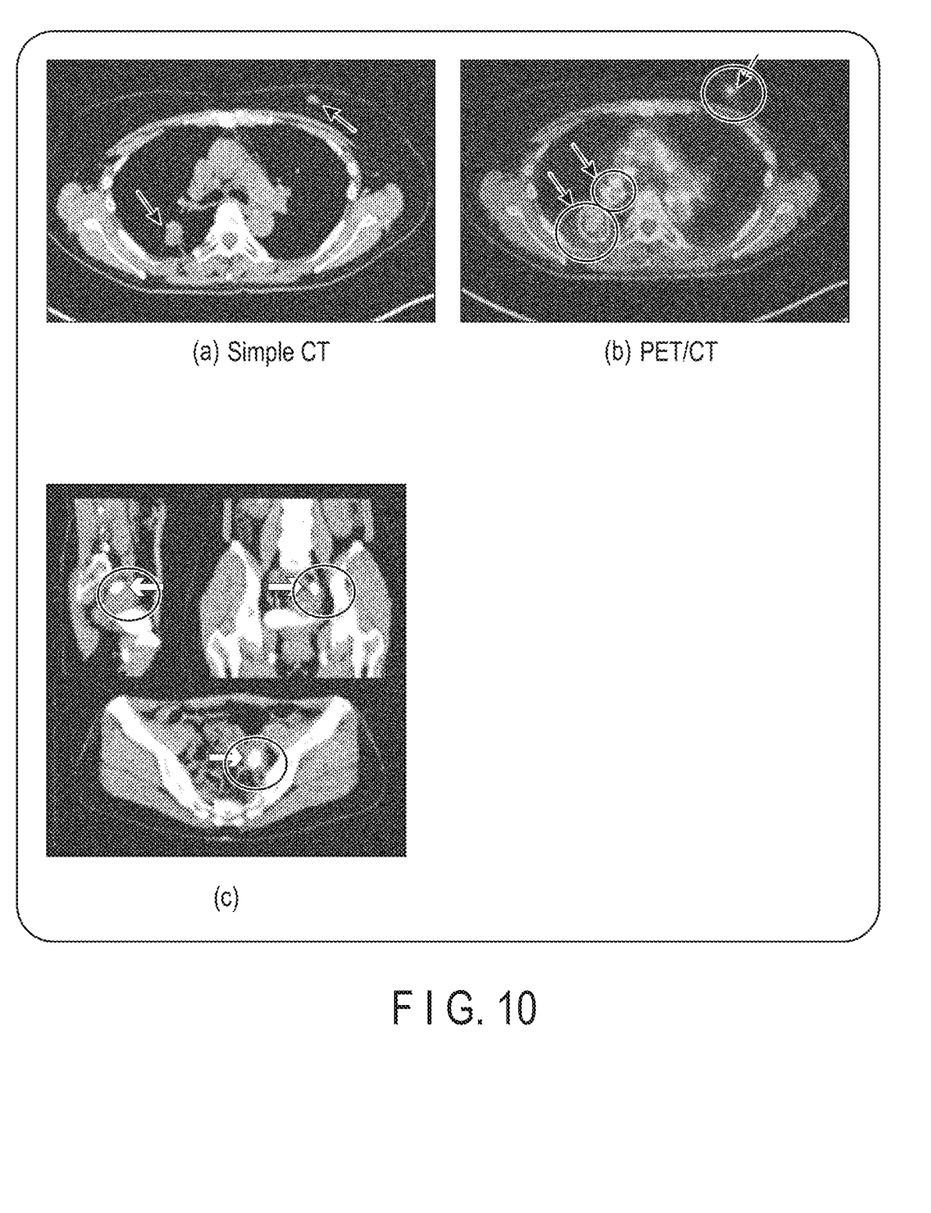
FIG. 10 is a set of photographs each showing a captured image example according to each of the embodiments.

Captured FDG-PET/CT images are shown in FIG. 10. FIG. 10(A) is a simple CT image of the chest, and high accumulation of [$^{18}$F]FDG was confirmed in the right lung lobe, the right hilar lymph node, and the left breast (at positions of arrows). FIG. 10(B) is a PET/CT image of the identical chest, and similarly, high accumulation of [$^{18}$F]FDG was confirmed in the right lung lobe, the right hilar lymph node, and the left breast (at positions surrounded by circles). FIG. 10(C) is a simple CT image of the abdomen, and high accumulation of [$^{18}$F]FDG was confirmed in the ovary. Therefore, the right lung lobe, the left breast, and the ovary were obtained as the first site information 7 (step S22).

Next, an exosome was isolated from the collected blood (S24). Proteins and nucleic acids were extracted from the exosome and identified (S25). As a result, miR-30c and miR-181c as exosomal molecules 10 were abundantly contained. Hence, miR-30c-rich and miR-181c-rich were obtained as the molecular information 11 on the exosome. When this result was collated with the information group in the database 13, it was found that the miR-30c was a specific molecule of lung cancer and the miR-181c was a specific molecule of breast cancer and brain metastasis. Here, miR-34a and MMP-1 mRNA as specific molecules of ovarian cancer were not contained. Therefore, the lung, the breast, and the brain were obtained as the second site information 12 (step 26).

Next, the first site information 7 was collated with the second site information 12. In the collation, first, information on sites (lung, breast, ovary, and brain) included in both the first site information 7 and the second site information 12 were acquired (step S27), and then each of the sites was applied to the conditions shown in Table 1. The determination was made for each site as follows (step S28): the lung and breast were true positive since they were included in the first site information 7 and were included in the second site information 12, the ovary was false positive since it was included in the first site information 7, but was not included in the second site information 12, and the brain was false negative since it was not included in the first site information 7, but was included in the second site information 12.

Based on the above-described results, it was estimated that the subject had tumors in the lung and breast (step S29).

Here, as a result of capturing FDG-PET/CT images, it is known that the lung is the right lung lobe and the breast is the left breast, and thus it may be estimated that a tumor is present in the right lung lobe and the left breast instead of simply estimating that a tumor is present in the lung and the breast.

Figure 11:
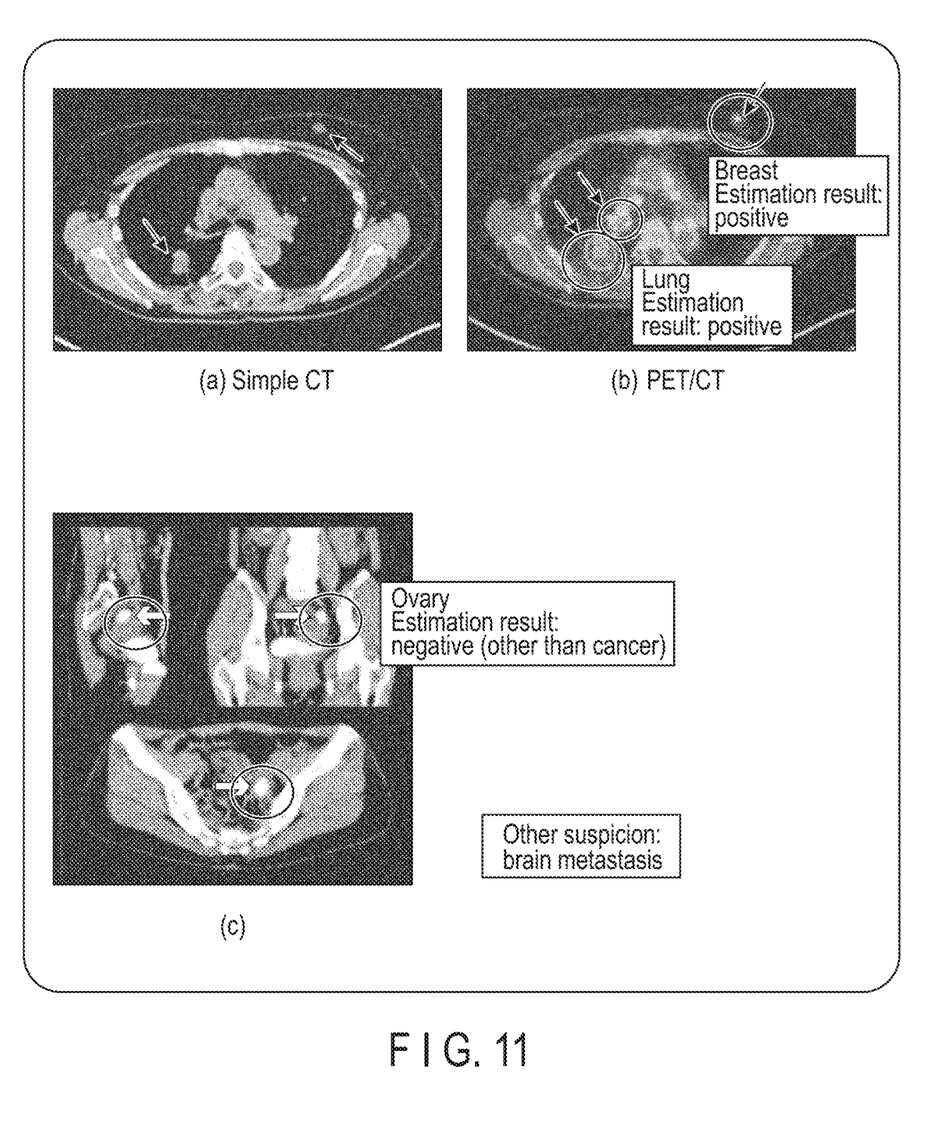
FIG. 11 is a set of photographs showing display examples of estimation results according to each of the embodiments.

For example, the estimation result obtained by the estimation unit 3 of the diagnosis support apparatus 1 may be displayed for each accumulation site of the diagnostic agent together with each captured image, as illustrated in FIG. 11. In addition, the brain metastasis determined as false negative may be displayed as "other suspicion".

In addition, a brain FDG-PET/CT image of brain metastasis determined as false negative was captured (step S30). As a result, multiple brain metastases were confirmed. From this result, it was estimated that brain metastasis was present in the subject 4 (step S31). It is also possible to reconfirm the authenticity of the determination by testing the site determined as false negative again.

The diagnosis support apparatus and the diagnosis support method according to the embodiments described above make it possible to reduce false positives and false negatives in the use of nuclear medicine imaging diagnosis alone, and to perform more accurate diagnosis.

Further, it is possible to reduce the variation in the quality of medical care due to the difference in the skill of nuclear medicine imaging specialists in the related art, and to equalize the quality.

Furthermore, the diagnosis support apparatus and the diagnosis support method according to the embodiments are less invasive as long as the image capturing and the blood collection are performed. Accordingly, it is possible to reduce the burden on the subject 4 and the healthcare professional.

Figure 12:
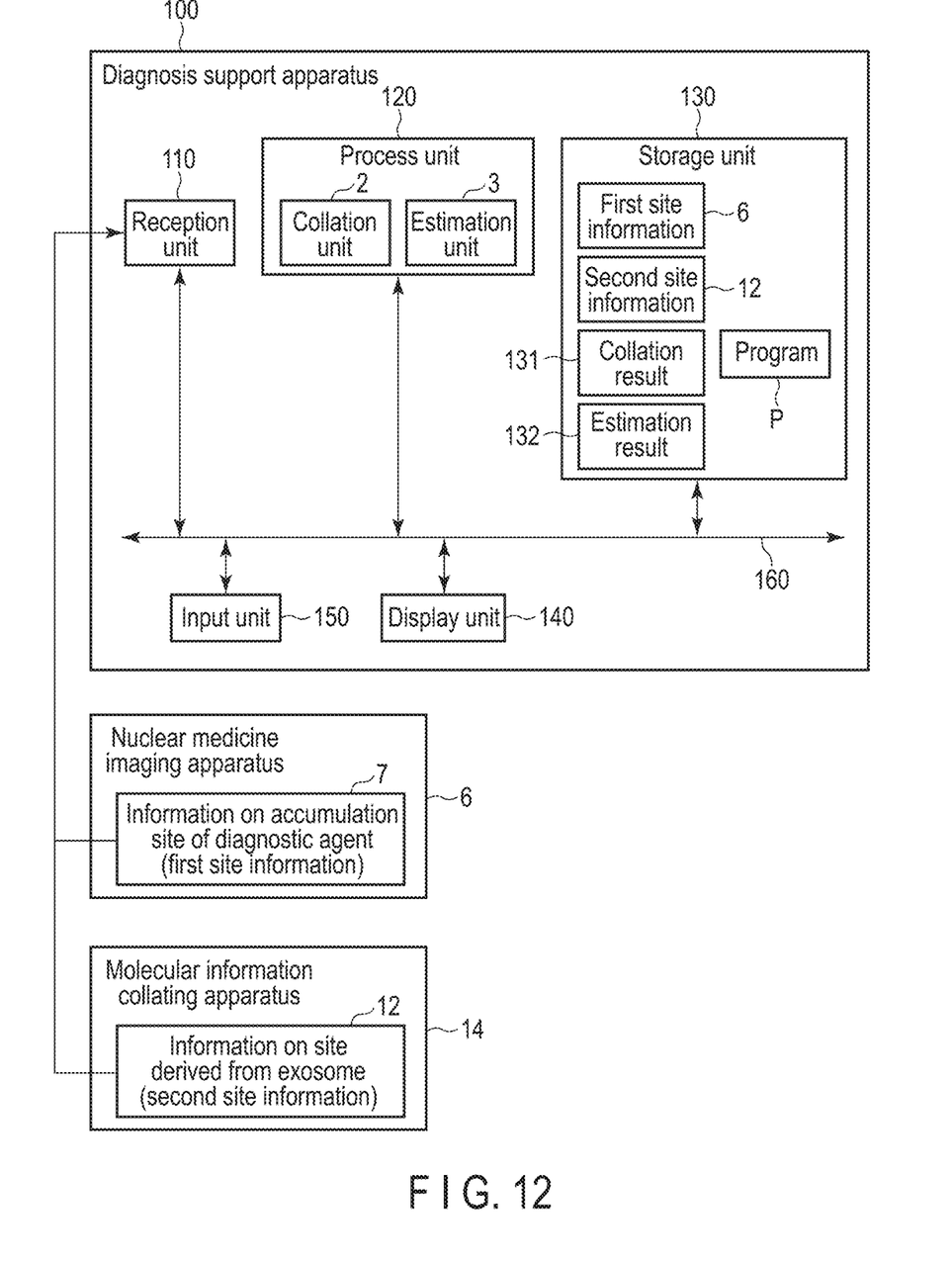
FIG. 12 is a block diagram illustrating an example of the diagnosis support apparatus according to each of the embodiments.

According to a further embodiment, the diagnosis support apparatus 1 may include a further unit, in addition to the collation unit 2 and the estimation unit 3. An example thereof is illustrated in FIG. 12. A diagnosis support apparatus 100 includes, for example, a reception unit 110, a process unit 120 including a collation unit 2 and an estimation unit 3, a storage unit 130, a display unit 140, and an input unit 150. These units are electrically connected via a bus 160.

The reception unit 110 receives the first site information 7 from the nuclear medicine imaging apparatus 6 and receives the second site information 12 from the molecular information collating apparatus 14. The received information is sent to the storage unit 130.

The storage unit 130 includes, for example, a nonvolatile memory and a volatile memory, and stores the first site information 7 and the second site information 12 sent from the reception unit 110, a collation result 131 sent from the collation unit 2, an estimation result 132 sent from the estimation unit 3, a program P for performing collation and estimation, and control of other units, and the like.

The process unit 120 includes the collation unit 2 and the estimation unit 3. The collation unit 2 collates the first site information 7 with the second site information 12 according to the program P, and sends the collation result 131 to the storage unit 130. The estimation unit 3 extracts the collation result 131 stored in the storage unit 130, and performs estimation based on the collation result 131 according to the program P. The estimation result 132 is sent to the storage unit 130.

The display unit 140 includes, for example, a display, a printer, and the like, and displays or outputs the estimation result 132.

The input unit 150 includes, for example, a mouse, a keyboard, a touch panel, a button, or a scanner, and inputs the start and end of each collation and estimation, parameters necessary for each process, or the like.

The diagnosis support apparatus 100 may be integrated with, for example, the nuclear medicine imaging apparatus 6 and/or the molecular information collating apparatus 14.

As described above, as a further embodiment, the diagnosis support program according to the third embodiment can be a program that executes a process, a part of the process or the whole process in the method described herein, or any combination thereof. For example, a further embodiment provides a program for estimating a site where a tumor of a subject is present. The program collates information on an accumulation site of a diagnostic agent obtained from a captured nuclear medicine image of a subject as first site information with information (second site information) on a site derived from an exosome containing the diagnostic agent collected from the subject as second site information; and estimates that, as a result of the collation, a tumor is present at a site of the first site information which is matched with the second site information.

For example, the program may further include a program for performing collation and estimation based on the conditional classification in Table 1 and/or the flow described with reference to FIG. 8.

According to at least one embodiment described above, it is possible to reduce false negatives and false positives in nuclear medicine imaging diagnosis. Further, according to at least one embodiment described above, it is possible to equalize the quality of medical care.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A diagnosis support apparatus, comprising:
   processing circuitry configured to collate first region information as information on an accumulation region of a diagnostic agent obtained from a captured nuclear medicine image of a subject with second region information as information on a region derived from an exosome containing the diagnostic agent collected from the subject; and
   a display configured to display, as a result from the processing circuitry, a region of the first region information that matches the second region information.

2. The diagnosis support apparatus of claim 1, wherein the display is further configured to display the region of the first region information that matches the second region information on an image obtained from the nuclear medicine image, and a message which indicates that the matched region is estimated as a region where a tumor is present.

3. The diagnosis support apparatus of claim 1, wherein the information on the region derived from the exosome is information collected from the subject before a half-life of the diagnostic agent passes.

4. The diagnosis support apparatus of claim 1, wherein the display displays, based on a result from the processing circuitry,
   a first result determined as a positive that a tumor is present at a first region that is included in the first region information and is included in the second region information,
   a second result determined as a false positive that a disease other than a tumor is present at a second region that is included in the first region information, but is not included in the second region information, and
   a third result determined as a false negative that a tumor is present at a third region that is not included in the first region information, but is included in the second region information.

5. A non-transitory computer-readable medium storing a diagnosis support program that, when executed by processing circuitry, causes the processing circuitry to collate first region information as information on an accumulation region of a diagnostic agent obtained from a captured nuclear medicine image of a subject with second region information as information on a region derived from an exosome containing the diagnostic agent collected from the subject.

6. The computer-readable medium of claim 5, wherein, as a result of the collation, the program causes the processing circuitry to estimate that a tumor is present at a region of the first region information that matches the second region information, and displays the region.

7. The computer-readable medium of claim 5, wherein the collection is performed before a half-life of the diagnostic agent passes.

8. The computer-readable medium of claim 5, wherein, as a result of the collation, the program causes the processing circuitry to:
   determine and display as a positive that a tumor is present at a first region that is included in the first region information and is included in the second region information,
   determine and display as a false positive that a disease other than a tumor is present at a second region that is included in the first region information, but is not included in the second region information, and
   determine and display as a false negative that a tumor is present at a third region that is not included in the first region information, but is included in the second region information.

9. A diagnosis support method that uses information on an accumulation region of a diagnostic agent obtained from a captured nuclear medicine image of a subject and information on a region derived from an exosome containing the diagnostic agent contained in the subject.

10. The method of claim 5, further comprising estimating and displaying a region where a tumor is present in the subject.

11. A diagnosis support method comprising:
   administering a diagnostic agent to a subject;
   capturing a nuclear medicine image of the subject;
   acquiring first region information as information on an accumulation region of the diagnostic agent from the obtained captured image;
   collecting an exosome containing the diagnostic agent from the subject;
   acquiring molecular information on the exosome;
   acquiring second region information as information on a region derived from the exosome, from the molecular information on the exosome; and
   collating the first region information with the second region information.

12. The diagnosis support method of claim 11, further comprising estimating and displaying that, as a result of the collating step, a tumor is present at a region of the first region information that matches the second region information.

13. The diagnosis support method of claim 11, wherein the collecting step is performed before a half-life of the diagnostic agent passes.

14. The diagnosis support method of claim 11, wherein the diagnostic agent is [$^{18}$F]FDG.

15. The diagnosis support method according to claim 11, wherein the acquiring the second region information further comprises acquiring the second region information by collating the molecular information on the exosome with an information group stored in a database, the information group associating information on a plurality of exosomal molecules with corresponding regions derived from the exosomal molecules.

\* \* \* \* \*